United States Patent Office 2,799,687
Patented July 16, 1957

2,799,687

CATALYTIC OXIDATION OF OLEFINS AND CONTACT BEDS AND CATALYST THEREFOR

Merle L. Gould and Raphael Katzen, Cincinnati, Ohio

No Drawing. Application December 23, 1952,
Serial No. 327,688

10 Claims. (Cl. 260—348.5)

This invention relates to a catalytic oxidation process, and more particularly to the oxidation of gaseous olefins, and to contact beds and catalysts useful therefor.

In the catalytic oxidation of olefins to olefin oxides, such as the oxidation of ethylene oxide, in the presence of a silver oxidation catalyst it has been found necessary to retard the oxidation so as to avoid complete oxidation. This has heretofore been effected by the continuous addition of vaporous catalytic suppressors, sometimes referred to as anti-catalysts, to the reactants, in the catalytic oxidation reaction in order to regulate the degree of olefin oxidation. These catalytic suppressors apparently inhibit the oxidizing propensities of the oxidation catalyst so that the oxidation of the olefin to its ultimate oxidation products (consisting mainly of carbon dioxide and water) is retarded.

Heretofore some normally liquid chemical compounds having an appreciable volatility at the oxidative temperatures have been used for olefin oxidation to effect such catalyst suppression, as, for instance, in Law and Chitwood Patents 2,279,469 and 2,279,470, which issued on April 14, 1942. In the use of such volatile compounds it has been found necessary to continuously add the compounds to the catalytic oxidation reaction as the compounds are decomposed during the course of the catalytic oxidation or are removed with the catalytic oxidation products. Moreover, it has also been found necessary to closely regulate the concentration of these catalytic suppressors within relatively narrow limits. Thus, if too small a concentration of such catalytic suppressor is present, an undue amount of complete olefin oxidation to the ultimate olefin oxidation products will result with a concomitant decrease in the selective yield of olefin oxide. Conversely, if too large a concentration of catalytic suppressor is present, the activity of the oxidation catalyst is unduly inhibited with a resultant decrease in the over-all yield of olefin oxidation products including the olefin oxide. Since the catalytic suppression effect of these catalytic suppressors is a function of the conditions of temperature, reactant feed rate, diluent gas concentration and other process variables, as well as of the nature of the catalytic suppressor, this degree of regulation must be closely controlled. Thus, if during the course of the catalytic oxidation the process variables are altered, it is necessary to adjust the concentration of catalytic suppressor. In some cases, particularly in the case of normally liquid halogen-containing catalytic suppressors, where the deactivating effect produced upon the catalyst by the suppressor is of long duration, alteration of the process variables once the process is commenced is not feasible. Moreover, a particularly precise regulation of the rate of catalytic suppressor addition must be exercised in the case of the last-mentioned catalytic suppressors, since the deactivating effect produced on the oxidation catalyst by such suppressors may in some cases result in a permanent inhibition of the catalytic oxidation activity of the catalyst.

A measure of the close control necessary in the case of normally liquid halogen-containing catalytic supressors may be gained from the fact that the continued use of but double the proper amount of these suppressors will reduce the production of catalytic oxidation product to practically nothing.

The use of solid catalytic suppressors has more recently been proposed in Sears Patent 2,615,900, issued October 28, 1952. Thus, Sears proposed to use certain metal halides, which are stable solids at temperatures up to 400° C., as catalytic suppressors for the oxidation of ethylene to ethylene oxide. However, Sears does not disclose the use of metal fluorides, which he apparently deemed useless in this regard. Moreover, Sears does not disclose that to obtain optimum catalytic conversion of the ethylene to ethylene oxide, it is necessary to closely regulate the maximum concentration and the rate of addition of the added halides particularly in the case of alkali metal halides. Thus, while the concentration of solid metal halide catalytic suppressors need not be controlled with the degree of precision required of the normally liquid catalytic suppressors, we have found that the addition of metal halide within the major part of the range disclosed by Sears, namely an over-all range of 0.01–50 percent by weight based on the silver component of the catalyst; the silver being present to the extent of 30 to 500 grams per liter of catalyst, is not productive of optimum results. As indicated above this is especially true in the case of alkali metal halides, and in particular, the chlorides and fluorides of sodium and potassium. While these last-mentioned salts constitute, when employed at optimum concentration levels, the most efficacious solid catalytic suppressors, it is necessary to adjust their concentration to a closely-controlled maximum limit, and to adopt other procedural embodiments. Otherwise, certain serious difficulties set forth below will be encountered.

This invention has as an object the provision of a method for preparing fluidized beds of particles useful as catalyst beds for the catalytic oxidation of olefins.

This invention has as a further object the provision of an efficient catalytic process for the oxidation of an olefin, such as ethylene, to its olefin oxide, utilizing a solid catalytic suppressor.

These and other objects are achieved by our invention which is predicated on the discovery that the presence of more than 5 weight percent of metal halide in a dense phase fluidized catalyst bed containing silver oxidation catalyst effects a marked deactivation of the olefin oxidation propensities of the catalyst and a consequent serious impairment of its efficacy. Moreover, we have found that the method of preparation of a catalyst bed containing such solid catalytic suppressor also markedly affects the catalytic efficacy of the catalyst bed, and in particular, the incremental rate of addition of the solid catalytic suppressor markedly affects the catalytic efficacy.

Thus, we have found that by preparing a catalyst bed through first fluidizing a mixture of silver oxidative catalytic component particles and inert filler component particles to form a dense phase fluidized bed of such particles (preferably maintaining said dense phase fluidized bed at a temperature of between 100 to 400° C.) and then adding (most preferably by incremental portions of 0.01 to .1 weight percent based on the silver oxidative catalytic component) particles of an inorganic halide component which is a solid at 400° C. and does not undergo substantial chemical transformation on contact with an olefin and air at 100 to 400° C., at extended periods of processing time up to a maximum concentration of 5 weight percent based on silver, the impairment of catalytic efficiency referred to above is completely avoided. Our invention has its greatest degree of usefulness in the case of alkali halide components, especially the chlorides and fluorides of potassium and sodium, which effect a more pronounced inactivation upon the silver oxidative catalytic component than other inorganic halides.

The preferred catalyst beds of our invention are prepared by forming a dense phase fluidized bed containing a mixture of silver oxide particles and inert filler component particles in which a reducing gas is used as the fluidizing gas and the fluidized bed is maintained at a temperature between 100 to 400° C. Under these conditions, the silver oxide is reduced to elemental silver. The inorganic halide component is then added to the fluidized mixture which is maintained at the aforementioned temperature during the addition.

As reducing gases, we prefer to employ mixtures of ethylene and air, and in particular mixtures comprising from 2–5 weight percent of ethylene and air, although other reducing gases such as hydrogen can be used.

The olefin oxidation process of our invention is effected at a temperature of between 100 to 400° C. in the presence of the aforementioned catalyst beds utilizing a gaseous charge comprising an olefin and molecular oxygen with the preferred olefin being ethylene and the preferred source of molecular oxygen being air.

By "silver oxidative catalytic component," we means to include, in addition to elemental silver oxidation catalysts, those silver salts especially silver oxide which under the olefin oxidation reaction conditions are transformed into elemental silver. Thus, the catalyst beds of our invention can comprise mixtures of silver oxide, inert filler component, and inorganic halide component, which silver oxide is reduced to elemental silver at the reaction conditions. However, we prefer to prepare the catalyst beds of our invention by first reducing the silver oxide to elemental silver and then adding the inorganic halide component. We make no claim to the silver oxidative catalytic component, per se, and accordingly any conventional elemental silver oxidation catalyst, or silver salt capable of being reduced to a useful elemental silver catalyst can be used as the silver oxidative catalytic component.

A wide variety of inert filler components can be utilized in the process of our invention. In fact, any material which is a solid and non-catalytic under the oxidizing conditions can serve this purpose. Examples of particularly useful materials include alumina, silica, silicon carbide, magnesia, etc. The filler may be composited with the silver oxidative catalytic component, or may be in the form of discrete particles, in conjunction with either discrete particles of the silver oxidative catalytic component, or with composited particles comprising the silver oxidative catalytic component and inert filler component.

The inorganic halide component utilized in the process of our invention must be a solid at 400° C. and must not undergo substantial chemical transformation on contact with the gaseous charge at the oxidative temperature. By "substantial chemical transformation" is meant a relatively rapid conversion to another chemical substance, such as the rapid conversion of the halide to the oxide, or to the elemental form of the cation. In particular, the alkali metal halides are to be preferred for use in the process of our invention especially the chlorides and fluorides of potassium and sodium. We especially prefer the use of potassium chloride as the inorganic halide component.

For the purposes of our invention the inorganic halide component should be maintained within the concentration range of between 0.01–5 weight percent based on the silver oxidative catalytic component and most preferably in the range 0.1–1.0 weight percent. Moreover, during the course of the on-stream processing life of the bed, the inorganic halide component should be added in increments of between 0.01 to 0.1 weight percent based on the silver oxidative catalyst component and not exceed the upper limit of 5 weight percent. The normal useful on-stream processing life of the bed can range from six months to a year or more. If the upper limit of this concentration range (5 weight percent) is exceeded, a serious degree of catalyst inactivation is effected if the catalyst is stored at room temperature for any appreciable period of time. Thus, if the catalytic suppressor is mixed with the oxidative catalytic component at room temperature, of if the catalyst bed mixture is stored at room temperature prior to use, the catalytic efficiency of the catalyst is impaired. Again, if the catalytic conversion unit is shut down, such as for repairs, catalyst-inventory replacement, etc., a reduction in the catalyst activity is likewise encountered. However, if the concentration of the inorganic halide component is maintained at a value below about 5.0 weight percent based on the total fluidized bed weight and preferably below about 1.0 weight percent thereof, and especially when the fluidized technique of catalyst bed preparation heretofore indicated is utilized for the preparation of the fluidized catalyst bed, the aforementioned difficulties are completely avoided. Thus, markedly higher degrees of catalytic conversion reflected in increased yields of olefin oxide can be obtained notwithstanding the presence of the catalytic suppressor. If the concentration of catalytic suppressor is reduced below 0.01 weight percent the selectivity of the catalyst for olefin oxide production is materially affected.

While we do not wish to be bound by the following theory, it is our belief that the aforementioned impairment of catalyst efficiency can be attributed to a form of hygroscopic conversion of the inorganic halide component resulting in halide ion liberation. This seems to occur most readily at room temperature upon exposure to the atmosphere, and is most marked with the alkali metal halides and, in particular, the fluorides or chlorides of sodium or potassium. It is our further belief that these halide ions selectively attack the active sites on the surface of the silver catalyst, and that for some reason unknown to us, these most active catalyst sites are halided so that the catalytic activity of the silver catalyst is impaired out of all proportion to the relatively minor degree of halogenation. While it is difficult to understand why the halogenation should selectively occur at the most active sites (if indeed our theory of the aforementioned catalyst impairment mechanism is correct), in any event there is a marked difference in the overall catalytic efficiency obtained in the process of our invention and that of other processes in which the catalyst is prepared with the metal halide being present in larger concentrations than those heretofore indicated, and where the fluidized bed technique of catalyst preparation heretofore described involving the use of temperatures within the range 100 to 400° C. is not used.

The following is illustrative of the relative proportions of the components which can be utilized in accordance with the process of our invention, it being understood, of course, that these proportions may be varied.

TABLE 1

| Silver, Weight Percent | Inert Particles, Weight Percent | Potassium Chloride, Weight Percent |
| --- | --- | --- |
| 22.97 | 70.0 | 0.03 |
| 29.70 | 70.0 | 0.30 |
| 19.97 | 80.0 | 0.03 |

While, as indicated above, the concentration of the inorganic halide component must be kept within the limits heretofore expressed, the relative concentration of silver to inert particles within the bed mixture may be varied along conventional lines and over a relatively wide range. During the course of the olefin oxidation it is necessary to periodically add at separate intervals of time, such as at incremental periods of a week or more, small incremental amounts of the inorganic halide component within the range 0.01 to 0.1 weight percent based on silver to make up for light losses.

While any of the conventional forms of fluidized techniques and apparatus can be utilized in the process of our invention, the use of the apparatus and method described in U. S. application for Letters Patent Serial No. 319,376, filed November 7, 1952, is to be preferred.

In a preferred embodiment of the process of our invention ethylene is oxidized to ethylene oxide although, of course, any olefin that is a gas at the oxidizing conditions can be used in the process of our invention. Any source of molecular oxygen can be used, although due to its cheapness, the use of air is preferred. Any of the conventional ratios of olefin to molecular oxygen can be used. While any conventional oxidative temperature such as an oxidative temperature of between about 100 to 400° C. can be used, a temperature about 175 to 300° C. is to be preferred, especially in the case of the oxidation of ethylene. Conventional pressures heretofore employed for the catalytic oxidation of olefins can be used, such as from about atmospheric pressure to about 200 pounds per square inch. A presure in the range 100 to 150 pounds per square inch is to be preferred.

When ethylene is oxidized in the presence of air through contact with a bed of particles in accordance with the process of our invention, a conversion of the order of 35 to 60% of the ethylene is preferentially effected per single pass to produce an effluent comprising ethylene oxide and also residual ethylene, unused oxygen, nitrogen and minor amounts of carbon dioxide. If desired, the ethylene oxide can be removed from the effluent by passage through an absorber to absorb the ethylene oxide, such as by absorption in an absorption tower containing water, and the remainder of the effluent recycled for the further conversion of the remaining ethylene to ethylene oxide.

In a preferred embodiment a major portion of the effluent from a first absorber equal to about 70 to 90% of the feed to the first reactor is recycled and the remainder plus additional oxygen is diverted to a second reactor, with the ethylene content of the effluent being further oxidized to ethylene oxide in both reactors. In this manner a high over-all yield of ethylene oxide can be secured, and moreover by the diversion of a portion of the effluent from the first reactor to the second reactor, the build-up of carbon dioxide above certain limits, such as above about 5 to 7% can be prevented.

The inorganic halide component may be added as discrete crystalline particles of the same size as the remaining particles either as the inorganic halide component, per se, such as in the case of potassium chloride as discrete crystalline particles of potassium chloride; or, if desired, the inorganic halide component may be added in the form of an impregnated deposit on the surface of the inert filler component. Thus, a potassium chloride solution may be impregnated upon the inert filler component such as alumina, so that after drying a residue of potassium chloride will remain deposited upon the alumina. The use of discrete crystalline particles is to be preferred.

It is of course desirable to particulate the catalyst bed particles to a size sufficiently small, such as equal to or smaller than particles capable of passing through an 80 mesh Tyler screen, so as to facilitate fluidization.

As illustrative of the preparation of contact beds in accordance with our invention, reference should be had to the following illustrative examples.

*Example 1*

3,600 grams of Carborundum, in the 100 to 325 mesh range, are ball-milled with approximately 1,800 grams silver oxide. The mixture is charged to a fluid reactor, fluidized with air and reduced at temperatures of 350 to 450° F. for approximately seven hours, with a 2 to 5 percent ethylene-and-air feed mixture. Upon completion of the reduction, the mixture is removed from the reactor and passed through an eighty-mesh screen. The mixture is then fluidized, raised to a temperature of 350 to 450° F. and is then ready for operation as a fluidized catalyst bed for fluid catalytic operations after the addition of between about 0.01 to 0.1 weight percent potassium chloride particles of 100 to 325 mesh size.

*Example 2*

23 lbs. of silver oxide is ball-milled with 24 lbs. of FF Carborundum[1] for thirty minutes. To this mixture 13 lbs. of GG Carborundum[2] are added and the entire batch is again mixed. The mixture is now ready to be reduced. A fluid reactor is heated to 450° F. and air containing 2 to 3 percent ethylene is circulated through the reactor at a velocity of approximately 1.5 ft. per second. The pounds of 180 GG Carborundum, plus one-fourth of the above mixture (15 lbs.) are charged into the top of the reactor. Three additional charges of the mixture of 15 lbs. each are dropped in the reactor at one-hour intervals. After the final addition, the reduction is continued at 450° F. for a period of one more hour. The mixture is then removed from the reactor, screened through an eighty-mesh screen, fluidized, raised to a temperature of 350 to 450° F., and is then ready for operation as a fluidized catalyst bed for fluid catalytic operation after the addition of between about 0.01 to 0.1 weight percent potassium chloride particles of 100 to 325 mesh size.

A illustrative of the conditions used and the yields that can be secured from our invention reference should be had to Table 2, below. The catalyst employed in the illustrative run set forth in Table 2 comprised a fluidized catalyst bed containing discrete particles of elemental silver, Carborundum and potassium chloride in the specified weight ratios, and the fluidized catalyst beds used in the first three runs were prepared in accordance with the process of our invention.

TABLE 2

| Temperature, ° C. | Catalyst bed composition by weight, gms. | | | | Gas throughput, S. C. F. H. | | | Conversion per pass, percent | Percent ethylene oxide |
|---|---|---|---|---|---|---|---|---|---|
| | Silver | Carborundum | KCl | Total | $C_2H_4$ | $O_2$ | $N_2$ | | |
| 204 | 480 | 1,120 | 1.0 | 1,601 | 2.0 | 10.0 | 38.0 | 40 | 68 |
| 208 | 480 | 1,120 | 2.0 | 1,602 | 2.0 | 10.0 | 38.0 | 38 | 68 |
| 215 | 480 | 1,120 | 5.0 | 1,605 | 2.0 | 10.0 | 38.0 | 35 | 70 |
| 195 | 480 | 1,120 | 0.0 | 1,600 | 2.0 | 10.0 | 38.0 | 35 | 55 |

Referring to Table 2, a comparison of the conversion per pass value obtained for the addition of 0.0 gram po-

[1] Silicon carbide (230–325 mesh) sold by the Carborundum Company.
[2] Silicon carbide (150–325 mesh) sold by the Carborundum Company.

tassium chloride with those obtained for the catalyst beds of our invention reveals that there is no reduction in catalytic conversion per pass due to inactivation of the catalyst notwithstanding the addition of the catalytic suppressor. In fact, the catalyst beds of our invention are not only more selective (as indicated by the percent ethylene oxide values obtained for the product), but moreover are as active or more active than catalyst bed compositions lacking the inorganic halide component, as indicated by the conversion per pass values. Thus, it is seen that the catalyst beds of our invention are not impaired by the presence of the solid inorganic halide catalytic suppressor. Moreover, the fluidized catalyst beds of our invention have an exceptionally long useful processing life. Thus, for example, no decrease in catalyst activity was observed for a fluidized catalyst bed of our invention that was continuously in use for the oxidation of ethylene to ethylene oxide for 80 days.

Our invention provides an efficient catalytic process for the oxidation of an olefin to its olefin oxide, and also an active and selective fluidized catalyst bed. High yields of the olefin oxide are secured, while at the same time the production of undesirable by-products is curtailed. Furthermore, the process of our invention permits the process variables, such as the oxidative temperature to be altered rapidly, and the catalyst oxidation to be effected at variant conditions. Accordingly, modifications in the olefin content of the gaseous charge can be rapidly accommodated for.

We have described specific embodiments for conducting our invention but it is to be understood that the invention is not to be restricted thereby. Thus, variations and alternatives may be used as will be evident to those skilled in the art.

Having thus described our invention, we claim:

1. A method for preparing a fluidized bed of particles useful as a catalyst bed for the catalytic oxidation of olefins which comprises fluidizing, in an on-stream condition, a mixture of unsupported silver oxidative catalyst component particles and inert diluent filler component particles to form a dense phase fluidized bed of said particles, adding to the aforesaid fluidized bed, at a temperature between 100 to 400° C. a total of between about 0.01 to about 5.0 weight percent, based on the silver component, of particles of an inorganic metal halide component to said dense phase fluidized bed, said inorganic metal halide component being a solid at a temperature of 400° C. and not undergoing substantial chemical transformation on contact with a mixture of an olefin and molecular oxygen at a temperature of about 100 to 400° C., and maintaining said dense phase fluidized bed for a sufficient period of time subsequent to the addition of said inorganic metal halide component particles to effect a uniform dispersion of said inorganic metal halide component particles in said dense phase fluidized bed.

2. A method for preparing a fluidized bed of particles useful as a catalyst bed for the catalytic oxidation of olefins which comprises fluidizing a mixture of unsupported silver oxidative catalyst component particles and inert diluent filler component particles to form a dense phase fluidized bed of said particles, adding at a temperature of between about 100 to 400° C. incremental amounts of between 0.01–0.1 weight percent based on the silver component, of particles of an alkali halide component to said dense phase fluidized bed up to a concentration of 5.0 weight percent based on the silver component, said alkali halide component being a solid at a temperature of 400° C. and not undergoing substantial chemical transformation on contact with a mixture of an olefin and molecular oxygen at a temperature of about 100 to 400° C., and maintaining said dense phase fluidized bed for a sufficient period of time subsequent to the addition of said alkali halide component particles to effect a uniform dispersion of said alkali halide component particles in said dense phase fluidized bed.

3. A method for preparing a fluidized bed of particles useful as a catalyst bed for the catalytic oxidation of olefins which comprises fluidizing a mixture of unsupported silver oxidative catalyst component particles and inert diluent filler component particles to form a dense phase fluidized bed of said particles, adding at a temperature of between about 100 to 400° C. incremental amounts of between 0.01–0.1 weight percent based on the silver component, of particles selected from the group consisting of potassium chloride, potassium fluoride, sodium chloride and sodium fluoride to said dense phase fluidized bed up to a concentration of 5.0 weight percent based on the silver component, and maintaining said dense phase fluidized bed for a sufficient period of time subsequent to the addition of said particles to effect their uniform dispersion in said densed phase fluidized bed.

4. A method for preparing a fluidized bed of particles useful as a catalyst bed for the catalytic oxidation of olefins which comprises fluidizing, in an on-stream condition, a mixture of unsupported silver oxide particles and inert diluent filler component particles with a reducing gas at a temperature of between about 100 to 400° C. to form a dense phase fluidized bed, reducing said silver oxide to unsupported elemental silver particles by contact with said reducing gas, thereafter adding to the aforesaid fluidized bed, at said temperature of between about 100 to 400° C. a total of between about 0.01 to 5.0 weight percent based on the silver of particles of an inorganic metal halide component to said dense phase fluidized bed of elemental silver particles and inert filler component particles, said inorganic metal halide component being a solid at a temperature of 400° C. and not undergoing substantial chemical transformation on contact with a mixture of an olefin and molecular oxygen at a temperature of between about 100 to 400° C., and maintaining said dense phase fluidized bed for a sufficient period of time subsequent to the addition of said inorganic metal halide component particles to effect their uniform dispersion in said dense phase fluidized bed.

5. A method for preparing a fluidized bed of particles useful as a catalyst bed for the catalytic oxidation of olefins which comprises fluidizing a mixture of unsupported silver oxide particles and inert diluent filler component particles with a fluidizing gas consisting of from 2–5 weight percent of ethylene and air at a temperature of between about 100 to 400° C. to form a dense phase fluidized bed, reducing said silver oxide to unsupported elemental silver particles by contact with said fluidizing gas, thereafter adding at a temperature between about 100 to 400 C. incremental amounts of between 0.01–0.1 weight percent, based on the silver, of particles of an inorganic metal halide component to said dense phase fluidized bed of unsupported elemental silver particles and inert diluent filler component particles up to a concentration of 5.0 weight percent based on the silver, said inorganic metal halide component being a solid at a temperature of 400° C. and not undergoing substantial chemical transformation on contact with a mixture of an olefin and molecular oxygen at a temperature of between about 100 to 400° C., and maintaining said dense phase fluidized bed for a sufficient period of time subsequent to the addition of said inorganic metal halide component particles to effect their uniform dispersion in said dense phase fluidized bed.

6. A method for preparing a fluidized bed of particles useful as a catalyst bed for the catalytic oxidation of olefins which comprises fluidizing a mixture of unsupported silver oxide particles and inert diluent filler component particles with a reducing gas at a temperature of between about 100 to 400° C. to form a dense phase fluidized bed, reducing said silver oxide to unsupported elemental silver particles by contact with said reducing gas, thereafter adding at said temperature of between 100 to 400° C. incremental amounts of between 0.01–0.1 weight percent, based on the silver of particles, selected from a group consisting of potassium chloride, potassium fluoride, sodium chloride and sodium fluoride to said dense phase fluidized bed up to a concentration of 5.0 weight percent based on the silver, and maintaining said dense phase fluidized bed for a sufficient period of time subsequent to the addition of said particles to effect their uniform dispersion in said dense phase fluidized bed.

7. A method for preparing a fluidized bed of particles useful as a catalyst bed for the catalytic oxidation of olefins which comprises fluidizing a mixture of unsupported silver oxide particles and inert diluent filler component particles with a fluidizing gas consisting of from 2–5 weight percent of ethylene and air at a temperature of between about 100 to 400° C. to form a dense phase fluidized bed, reducing said silver oxide to unsupported elemental silver particles by contact with said fluidizing gas, thereafter adding at said temperature of between about 100 to 400° C. incremental amounts of between 0.01–0.1 weight percent, based on the silver of particles, selected from a group consisting of potassium chloride, potassium fluoride, sodium chloride and sodium fluoride to said dense phase fluidized bed up to a concentration of 1.0 weight percent based on the silver, and maintaining said dense phase fluidized bed for a sufficient period of time subsequent to the addition of said particles to effect their uniform dispersion in said dense phase fluidized bed.

8. The process of making ethylene-oxide by the direct catalytic oxidation of ethylene, which includes contacting a gaseous charge-stream comprising ethylene and molecular oxygen at a temperature of between about 100° and 400° C. with an ethylene-oxidation fluidized catalyst bed composed of discrete particles of an inert diluent filler and a silver oxidative catalyst from the group consisting of unsupported particles of elemental silver and unsupported particles of a silver compound convertible to unsupported elemental silver particles on contact with ethylene at the aforesaid temperature, and incrementally adding to said fluidized catalytic bed, in an on-stream condition, small amounts (in relation to the silver) of discrete particles of an inorganic metal halide which remains solid at a temperature of 400° C.

9. A process according to claim 8, in which the increments of the halide are of the order of 0.01 to 0.1 weight-percent of the silver content of the fluidized bed.

10. A process according to claim 8, in which the silver oxidative catalyst is silver oxide.

References Cited in the file of this patent

UNITED STATES PATENTS

| | | |
|---|---|---|
| 1,998,878 | Lefort | Apr. 23, 1935 |
| 2,392,750 | Linn | Jan. 8, 1946 |
| 2,424,085 | Bergsteinsson et al. | July 15, 1947 |
| 2,487,159 | McAdams et al. | Nov. 8, 1949 |
| 2,615,900 | Sears | Oct. 28, 1952 |
| 2,628,965 | Sullivan | Feb. 17, 1953 |
| 2,752,363 | Drummond | June 26, 1956 |